May 6, 1941. C. R. GRAHAM 2,241,344
PRESS LOADING PLATFORM
Filed July 21, 1938 2 Sheets-Sheet 1

INVENTOR
CLARENCE R. GRAHAM.
BY
ATTORNEY

May 6, 1941.　　　　C. R. GRAHAM　　　　2,241,344
PRESS LOADING PLATFORM
Filed July 21, 1938　　　　2 Sheets-Sheet 2

INVENTOR
CLARENCE R. GRAHAM.
BY
ATTORNEY

Patented May 6, 1941

2,241,344

UNITED STATES PATENT OFFICE 2,241,344

PRESS LOADING PLATFORM

Clarence R. Graham, North Tonawanda, N. Y., assignor to Curtiss-Wright Corporation, a corporation of Delaware Application July 21, 1938, Serial No. 220,452

5 Claims. (Cl. 113—38)

This invention relates to loading and unloading equipment, and provides improvements which are particularly appropriate to use with large vertical presses adapted for stamping and cutting operations of sheet metal, the provisions of the invention affording means by which the production capacity of the indicated types of presses may be materially increased.

In order to gain a fuller understanding of the conditions under which the invention is best adapted to be used, a brief outline will be given of a currently used cutting and forming method utilizing large hydraulic presses. In the cutting and forming of sheet metals of moderate thickness, it has been found that these operations may be expedited by using flat metal cutting and forming dies over which a metal blank is placed. A hydraulic press, having a bed upon which the dies are assembled, is provided with a fairly thick sheet of rubber on the press ram, and upon lowering of the ram, the rubber engages the metal blank and upon the imposition of suitable press pressure, the rubber deforms the metal blank between the interstices of the die plates, causing parting or forming of the sheet metal according to the particular purpose and formation of the die plates themselves. By this process, only one die for a form need be used, the rubber comprising a universal upper die adapted for use with any number or any form of die plates which are arranged on the press bed.

In the initial practice of the above indicated method, the die plates have been assembled directly upon the press bed, and between pressings, a number of operators are needed to unload the bed and to reload same with new metal blanks or with a new set of die plates if different parts are to be cut or formed. Since the modern hydraulic presses are quick acting, the time for effecting a pressing operation may be substantially less than one minute, whereas the time for unloading and reloading the press bed may be much greater than one minute. Accordingly, the press is not used to maximum efficiency, since the ratio of loading and unloading time to press time is high.

It is an object of this invention to provide means for expeditiously loading and unloading a press whereby the production capacity of the press may be more efficiently utilized.

A further object is to provide a plurality of loading stations separate from and around a press, which loading stations are separate from the press itself. Upon effecting the loading at one station, upon a movable plate, the plate may be moved upon the press bed, the press operated, and the plate removed from the press in a very brief period. By the provision of a plurality of such loading stations and equipments, the stations may be operated in sequence, thereby multiplying the production capacity of the press by a factor equal to the number of loading stations.

A further object of the invention comprises the provision of structures and mechanisms appropriate to the expeditious operation of the press, and to detailed provisions by which relatively small effort is required on the part of the press crew to operate the stations.

A further object of the invention is to provide means for increasing the safety of press operation, wholly obviating the possibility of inadvertent operation of the press during a period when the press crew is in dangerous proximity to the operating parts of the press.

A full understanding of the provisions and details of the invention may be better understood by referring to the annexed description in connection with the drawings, in which.

Figure 3:
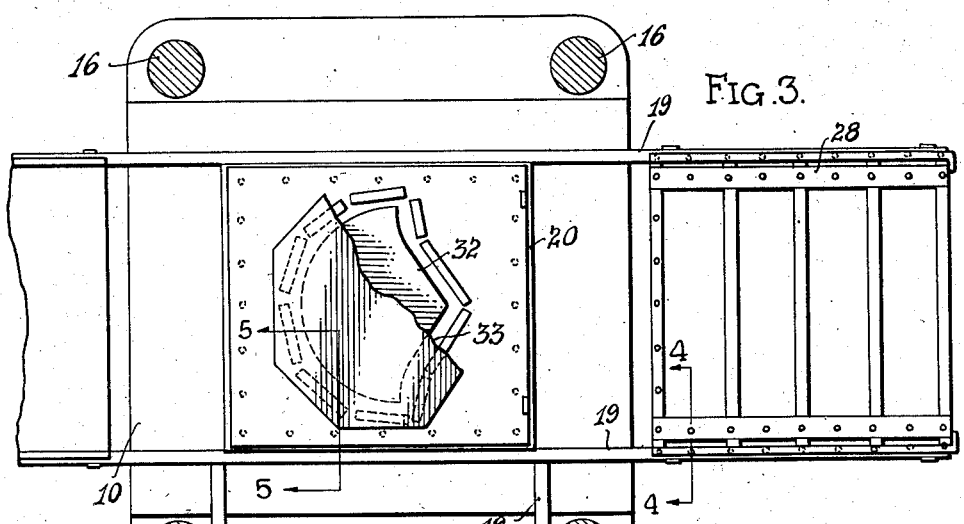
Fig. 3 is a plan view of the press bed and loading and unloading platforms.
Figure 4:
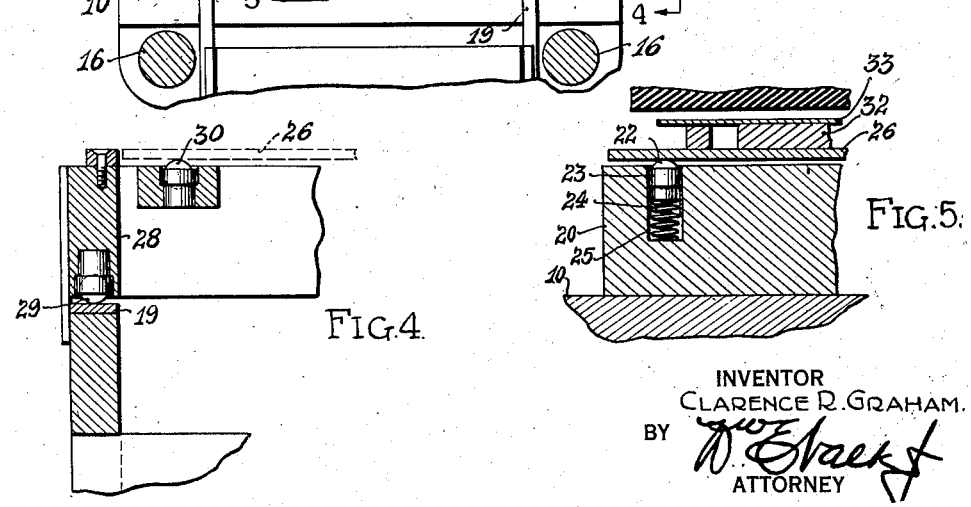
Figure 5:
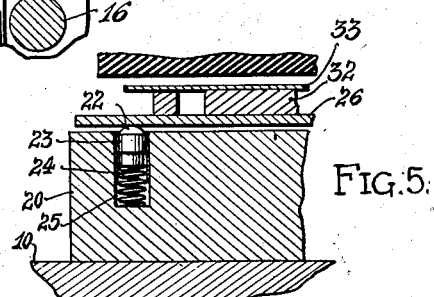

Figs. 4 and 5 are sections, respectively, on the lines 4—4 and 5—5 of Fig. 3.

Figure 1:
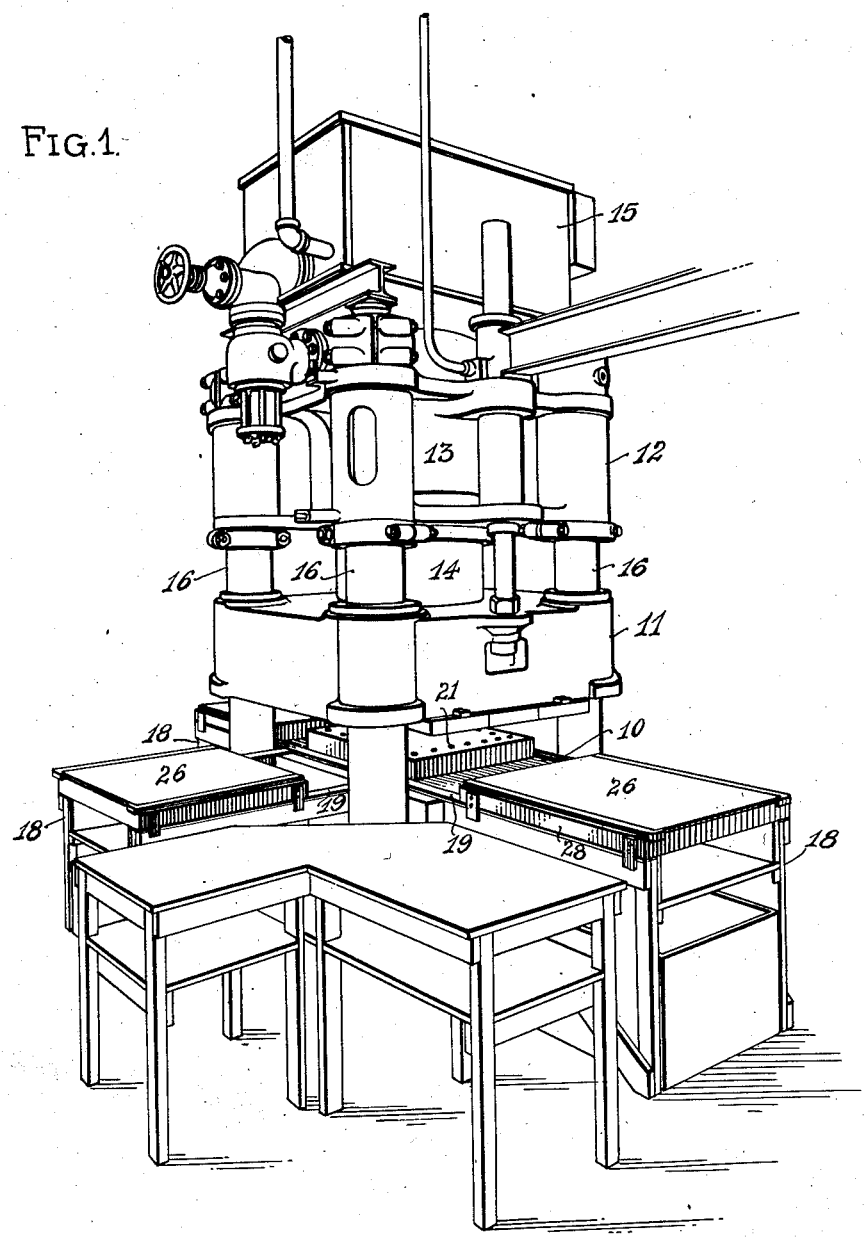
Fig. 1 is a perspective view of a hydraulic press equipped with the provisions of the invention.
Figure 2:
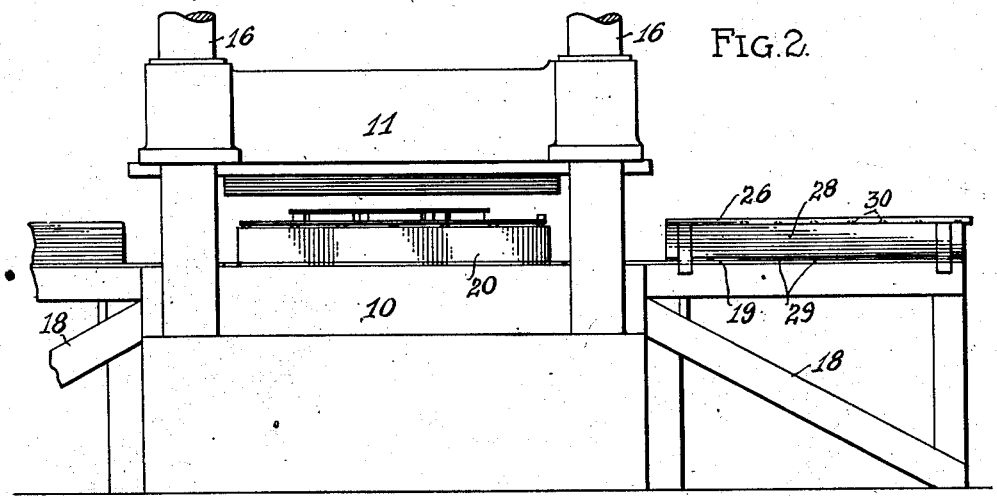
Fig. 2 is a side elevation of a lower portion of a press, showing the loading and unloading platforms and their relation to the press.

Figs. 1 and 2 illustrate portions of a conventional large capacity vertical hydraulic press, wherein 10 indicates a horizontal press bed, 11 is the press ram, 12 is the press head carrying a hydraulic cylinder 13 within which a plunger 14, fixed to the ram 11, is slidable. The press includes a fluid reservoir 15 and various conduits and connections between the reservoir and the cylinder 13 which are well known to those familiar with press construction. In addition to the press portions shown, are remote control operating devices, not shown, by which the press ram 11 may be lowered and elevated with respect to the head 12 for expeditious operation of the press per se.

It will be noted that the ram 11 is slidably carried on vertical columns 16 which likewise support the head 12 so that pressure reaction between the ram and the bed is assumed in tension through the columns 16.

As indicated above, conventional practice in operation of a press of this character comprises the assembly on the bed 10 of the articles to be pressed, whereupon the ram 11 is operated, after which the pressed articles are removed from the bed.

According to this invention, I provide a plurality of tables 18 arranged opposite the several sides of the press, these tables being provided with rails 19 which extend to a platen 20 permanently resting upon the bed 10. Said platen is equipped with a plurality of casters 21 which, as shown in Fig. 5, comprise balls 22 seated in cups 23 and spring-pressed upwardly by springs 24, the assembly 22, 23 and 24 being contained within a drilling 25 in the platen 20. The springs 24 will be of such capacity as to sustain, clear of the platen 20, a platen plate 26 with its load, for loading and unloading operations, but these springs will be compressed upon lowering of the ram so that the platen plate 26 will be borne upon the surface of the platen 20.

Carriages 28, provided with casters 29, are slidable upon the rails 19, these carriages being movable from a position over their respective tables 18, shown in Fig. 3, to a position wherein the inner edge of the carriage abuts the platen 20. The carriage surface is provided with casters, either ball or wheel, shown at 30, upon which the platen plate 26 may rest for loading and unloading.

It will now be seen that, when the press ram 11 is raised, any carriage 28 may be moved from its table 18 toward the platen 20, after which the platen plate 26 may be rolled from the carriage 28 to the platen 20. Thereupon, the carriage 28 is slid back to its table and the press ram 11 is operated to accomplish a pressing operation upon dies and blanks such as 32, 33 assembled upon the platen plate 26. After raising of the ram, the carriage 28 is again moved toward the platen 20, the platen plate 26 is rolled back upon the carriage, and the carriage with the platen plate is rolled away from the press. Since the unloading and loading time for one platen plate 26 is greater than the cycle of press operation, and since another platen plate has been loaded during the above described pressing operation, a second platen plate may be moved to the press and a pressing operation accomplished while the first platen plate is being unloaded and reloaded.

It will be seen that, for a conventional four-sided press, a maximum of four tables 18 with their carriages and platen plates may be disposed around the press. However, in a practical application of the invention already in operation, it has been found that three loading tables are adequate to serve the press to full capacity, the fourth side being utilized as a station for the press operator who will be close to the control apparatus of the press and likewise close to the work, so that he may at all times observe the effectiveness of his pressing operation and also observe the several loading and unloading stations and the readiness of their crews for press loading.

Obviously, a plurality of racks or tables may be provided adjacent each loading and unloading station from and to which blanks and press products may be transferred from the platen plates 26.

For standardization of the parts utilized in a loading and unloading organization of this character, all of the several casters have been shown as ball casters. However, roller casters may be used on the carriages 28, since the carriage and platen plate movement is always in a straight line. However, on the press platen 20, ball casters are particularly desirable to support platen plates freely above the platen as they approach and withdraw from the platen in different directions. The spring-pressed casters afford means by which the plates may be moved to and from the press with a minimum of effort, thereby expediting press operation.

In an actual operative press set-up, prior to the use of the invention, the press comprised a "bottle neck" in a fabrication process which, without the use of this invention, would have necessitated either the duplication of press equipment or multi-shift attendance upon the press, this being due to the fact that only a limited number of men could work at the press at one time, and due to the further factor that extra precautions had to be taken to assure safety in clearing all operators from the vicinity of the press before a pressing operation was engaged in. By the installation of the equipment of this invention, a plurality of crews could work on one press at the same time with no interference one with the other, and with a maximum of safety, since none of the crews worked immediately adjacent the press ram. Production by the use of the invention was so increased that the press no longer became a "bottle neck" in the production system, but rather, was able to more than keep up with the requirements for pressed parts.

The drawings illustrate the production equipment as applied to a press process using rubber as one die, the rubber being continually carried by the press ram. However, it will be apparent that the invention may be utilized with match plate die arrangements whereby one or more die assemblies may be placed upon any one of the platen plates 26, the whole assembly being moved to the press for a pressing operation, and thereafter being moved away from the press.

It will be appreciated that this invention is best adapted for large hydraulic presses wherein the beds and rams are of large dimensions, such presses having bed dimensions from 2' x 2' up to 8' x 8'. In this type of press, manual loading and unloading is the more common practice due to the size of the press and the parts to be pressed, as distinct from small presses using automatic feed arrangements.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination with a multi-sided press comprising a bed and a ram vertically disposed thereabove, a platen on the press having a plurality of spring-pressed ball casters projecting upwardly beyond the platen surface, rails extending laterally beyond and from a plurality of sides of the bed, carriages rollable along said rails, casters projecting upwardly from the several carriages, and platen plates, one for each carriage, adapted to be supported on said carriage for loading and unloading operations, and to be rolled from the carriage to the press platen on said casters prior to pressing operations.

2. In combination with a press having a bed, a ram, and corner columns supporting the ram spaced from the bed and ram corners, loading tables at at least two sides of the press spaced outwardly from the bed sides, carriages rollable on said tables between positions adjacent the bed and remote therefrom so as to be free of interference with said columns, rollers on the tops of respective carriages, rollers on the top of the press bed, and a loading plate, for each carriage, movable between the bed and its carriage upon said rollers when the carriage is adjacent the press bed, said bed rollers being retractable when ram pressure is imposed thereon through the loading plate.

3. The combination with a stamping-press comprising an upstanding non-yielding bed, and a ram carrying a heavy rubber die larger than the bed movable relatively thereto; of apparatus for alternately placing upon and withdrawing from the top surface of the bed and beneath the ram one or more stamping-dies, said apparatus comprising a table disposed to one side of the press with the table-top at a lower level than the level of the top of the bed, a carriage movable along said table-top from a press-loading position closely adjacent to one side of the bed to an unloading position distantly removed therefrom and vice versa, the top of the carriage, when the carriage is in press-loading position, being substantially coplanar with the top of the bed, and a die-supporting plate slidably shiftable from a position atop said carriage to a position atop said bed and vice versa when said carriage is in said press-loading position, said plate, when shifted onto the carriage, being movable bodily therewith to an unloading position remote from the bed and wholly to one side of the path of travel of the ram.

4. The combination with a stamping-press comprising an upstanding non-yielding bed, and a ram carrying a heavy rubber die larger than the bed movable relatively thereto; of apparatus for alternately placing upon and withdrawing from the top surface of the bed and beneath the ram one or more stamping dies, said apparatus comprising a table disposed to one side of the press with the table-top at a lower level than the level of the top of the bed, a carriage movable along said table-top from a press-loading position closely adjacent to one side of the bed to an unloading position distantly removed therefrom and vice versa, the top of the carriage, when the carriage is in press-loading position, being substantially coplanar with the top of the bed, a die-supporting plate slidably shiftable from a position atop said carriage to a position atop said bed and vice versa when said carriage is in press-loading position, said plate, when shifted onto the carriage, being movable bodily therewith to an unloading position remote from the bed and wholly to one side of the path of travel of the ram, and anti-friction means between the bed and the plate to facilitate the shifting movement of the latter, said means being yieldable under ram pressure whereby said plate may rest on the bed in a stamping operation.

5. The combination with a stamping-press comprising an upstanding non-yielding bed, and a ram carrying a heavy rubber die larger than and movable relatively to the bed; of apparatus for alternately placing upon and withdrawing from the top surface of said bed and beneath the ram first one and then another of at least two sets of stamping-dies, said apparatus comprising a table mounted to one side of the press with the table-top at a lower level than the level of the top of the bed, a second table similarly mounted at a different side of the press, a carriage for each table, each said carriage being movable along its associated table top from a press-loading position closely adjacent to said bed to an unloading position distantly removed therefrom and vice versa, the top of each said carriage, when said carriage is in said press-loading position, being substantially coplanar with the top of the bed, and a die-supporting member for each set of dies and for each said carriage, each said member being slidably shiftable from a position atop its associated carriage to a position atop said bed and vice versa when in press-loading position, and each said member, when shifted onto its associated carriage, being bodily movable therewith to an unloading position remote from the bed and wholly to one side of the path of travel of the ram, said carriages and the die-supporting member associated with each being adapted for alternate shifting movement whereby when one is in an unloading position the other is in loading position and vice versa.

CLARENCE R. GRAHAM.